United States Patent Office 2,741,609
Patented Apr. 10, 1956

2,741,609

N-PROPYLNORMORPHINE COMPOUNDS

John Weijlard, Maplewood, N. J., assignor to Merck & Co., Inc., Rahway, N. J., a corporation of New Jersey No Drawing. Application November 22, 1952, Serial No. 322,138

6 Claims. (Cl. 260—285)

This invention is concerned generally with novel derivatives of morphine and with processes for preparing these morphine derivatives. More particularly, it relates to N-n-propylnormorphine, to the lower alkanoyl esters of N-n-propylnormorphine, and acid salts thereof, new compounds which are active as morphine antagonists, and to the process of preparing these new morphine antagonists starting with normorphine.

N-n-propylnormorphine, its lower alkanoyl esters, and acid salts thereof, subject of the present invention, may be chemically represented by the following structural formulae:

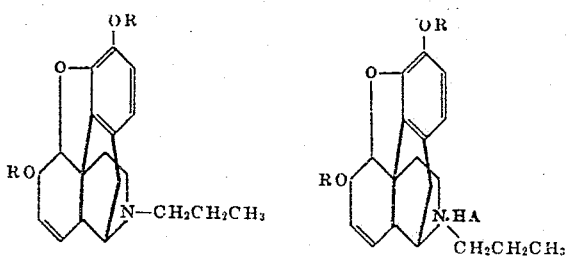

wherein R is hydrogen or a lower alkanoyl radical, and HA is an acid.

The chemical relationship of N-n-propylnormorphine, and its esters, to morphine is clear from a comparison of the foregoing formulae with the structural formula of morphine which is as follows:

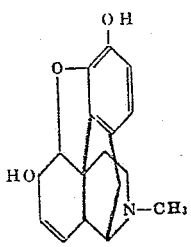

Whereas the alkaloid morphine is a potent analgesic, I have found that N-n-propylnormorphine, its esters, and acid salts thereof, are strong morphine antagonists and prevent or abolish the analgesic action of morphine when utilized in conjunction with that drug. This antagonistic action possessed by N-n-propylnormorphine is particularly surprising in view of the fact that other N-alkylnormorphine compounds such as N-ethylnormorphine, N-n-butylnormorphine, N-n-amylnormorphine, N-n-hexylnormorphine exhibit no appreciable morphine antagonist activity.

The N-n-propylnormorphine, its lower alkanoyl esters, and acid salts thereof, can be prepared by reactions which may be chemically represented as follows:

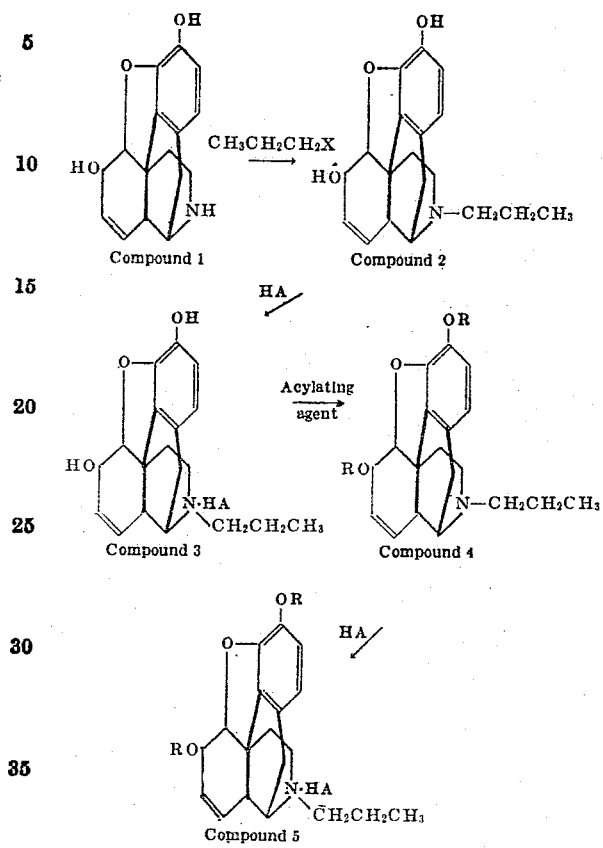

wherein R is a lower alkanoyl radical and HA is an acid.

The reactions indicated hereinabove, are carried out as follows: normorphine (Compound 1) is reacted with an n-propyl halide thereby forming N-n-propylnormorphine (Compound 2); the latter compound is reacted with an acid to produce the corresponding acid salt of N-n-propylnormorphine (Compound 3); alternatively the N-n-propylnormorphine is reacted with a lower alkanoic anhydride thereby producing the corresponding 3,6-dialkanoyl-N-(n-propyl)-normorphine (Compound 4) which is converted by reaction with an acid to the corresponding acid salt of 3,6-dialkanoyl-N-(n-propyl)-normorphine (Compound 5).

The reaction between the normorphine and n-propyl halide is ordinarily conducted by heating the reactants together in contact with an acid binding agent in a liquid medium which is substantially inert under the reaction conditions and which is a solvent for the reactants. I prefer to utilize as the liquid medium a lower aliphatic alcohol such as methanol, ethanol, propanol, and the like. The liquid medium employed should be substantially free of water. As the acid-binding agent, I ordinarily utilize an alkali metal carbonate such as sodium carbonate, potassium carbonate, an alkali metal bicarbonate such as sodium bicarbonate, potassium bicarbonate, an alkaline earth metal carbonate such as calcium carbonate, barium carbonate, and the like. I prefer to conduct the reaction by bringing together, in an organic solvent, approximately equimolar quantities of normorphine and an n-propyl halide such as n-propyl-chloride, n-propyl-bromide, n-propyl-iodide, and the like, and heating the mixture under reflux in contact with an excess of the acid-binding agent for an extended period of time.

I have found that, under these reaction conditions, a heating period of about eight hours or more is ordinarily required to complete the reaction between the normorphine and the n-propyl halide.

The N-n-propylnormorphine thus obtained is conveniently recovered by evaporating the organic solvent from the reaction mixture, preferably under reduced pressure, and extracting the residual material with a hot chlorinated solvent such as chloroform. The chlorinated solvent extract is filtered thereby removing any unreacted normorphine which is insoluble in chlorinated solvents, and the filtered solution is evaporated to dryness to give crude N-n-propylnormorphine, which can be rendered crystalline by trituration with ether or petroleum ether, and the resulting crystalline product purified by recrystallization from aqueous lower aliphatic alcohols such as methanol and ethanol.

The N-n-propylnormorphine is then reacted with a lower alkanoic anhydride such as acetic anhydride, propionic anhydride, and the like, thereby esterifying the hydroxyl radicals in the 3- and 6-positions of the molecule to form the corresponding 3,6-dialkanoyl-N-(n-propyl)-normorphine such as 3,6-diacetyl-N-(n-propyl)-normorphine; 3,6 - dipropionyl - N - (n-propyl)-normorphine; 3,6-dibutyryl-N-(n-propyl)-normorphine, and the like. The reaction between the alkanoic acid anhydride and the N-n-propylnormorphine is ordinarily conducted by heating a mixture of the reactants to a temperature of about 120° C. for a period of about one to two hours. The reaction mixture is then evaporated under reduced pressure, the residual material triturated with water thereby hydrolyzing excess alkanoic anhydride, the aqueous mixture is cooled, and the crystalline material is recovered by filtration and dried to give substantially pure 3,6-dialkanoyl-N-(n-propyl)-normorphine.

The conversion of the N-n-propylnormorphine or its lower alkanoyl ester, 3,6-dialkanoyl-N-(n-propyl)-normorphine, to the corresponding acid salts is ordinarily conducted by reacting the N-n-propylnormorphine or the 3,6-dialkanoyl-N-(n-propyl)-normorphine, under substantially anhydrous conditions, with an acid as for example, hydrogen chloride, hydrogen bromide, sulfuric acid, acetic acid, tartaric acid, citric acid, and the like. This salt-forming reaction is conveniently carried out by dissolving the N-n-propylnormorphine in a hot lower alkanol, such as ethanol, methanol, propanol, and the like, and adding to the solution a slight excess of an alcoholic solution of the appropriate acid. Upon diluting the resulting alcoholic reaction medium with an alcohol-miscible non-solvent for the product, such as diethyl ether, there crystallizes from the mixture the acid salt of N-n-propylnormorphine or the acid salt of 3,6-dialkanoyl-N-(n-propyl)-normorphine, such as N-n-propylnormorphine hydrochloride, N-n-propylnormorphine hydrobromide, N-n-propylnormorphine sulfate, N-n-propylnormorphine tartrate, N-n-propylnormorphine acetate, 3,6-diacetyl-N-(n-propyl)-normorphine hydrochloride; 3,6-diacetyl-N-(n-propyl)-normorphine hydrobromide; 3,6-diacetyl-N-(n-propyl)-normorphine sulfate; 3,6-diacetyl-N-(n-propyl)-normorphine acetate; 3,6-diacetyl-N-(n-propyl)-normorphine tartrate; 3,6-dipropionyl-N-(n-propyl)-normorphine hydrochloride; 3,6-dipropionyl-N-(n-propyl)-normorphine hydrobromide; 3,6-dipropionyl-N-(n-propyl)-normorphine sulfate; 3,6-dipropionyl-N-(n-propyl)-normorphine acetate; 3,6-dibutyryl-N-(n-propyl)-normorphine hydrochloride; 3,6-dibutyryl-N-(n-propyl)-normorphine hydrobromide; 3,6-dibutyryl-N-(n-propyl)-normorphine sulfate; 3,6-dibutyryl-N-(n-propyl)-normorphine tartrate, and the like, and the salt thus formed is recovered from the alcoholic slurry by filtration or centrifugation.

The following examples illustrate methods of carrying out the present invention, but it is to be understood that these examples are given for purposes of illustration and not of limitation.

*Example 1*

A mixture of 6 g. of normorphine, 2.68 g. of sodium bicarbonate, 3.76 g. of n-propyl iodide and 75 ml. of absolute ethanol was heated under reflux with stirring for a period of about fifteen hours. At the end of this period, some insoluble material was present and was removed by filtration. The filtered solution was evaporated to dryness under reduced pressure, and the residual material was extracted with two portions of hot chloroform. The clear chloroform extracts were combined and evaporated to dryness in vacuo. The residual material was triturated with 50 ml. of ether until crystallization was complete, the crystalline product was dissolved in 50 ml. of methanol, the methanol solution was stirred with activated charcoal, filtered and the filtered solution evaporated to about 15 ml. volume. The resulting solution was allowed to stand overnight at about 5° C. and the crystalline material which separated was recovered and recrystallized twice from a mixture of five parts of methanol and four parts of water to give substantially pure N-n-propylnormorphine; M. P. 244–245° C.; $[\alpha]_D^{25°\,C.} = -140°$. *Analysis.*—Calc'd for $C_{19}H_{23}NO_3$: C, 72.83; H, 7.40. Found: C, 73.38; H, 7.19.

*Example 2*

One and one-half grams of N-n-propylnormorphine (free base) were dissolved in 20 ml. of absolute ethanol, and the solution was acidified with an ethanol solution of hydrogen chloride. Thirty milliliters of diethyl ether was added to the acidified solution, whereupon an amorphous solid precipitated which was removed and recrystallized twice from methanol to give substantially pure N-n-propylnormorphine hydrochloride solvated with one molecule of methanol of crystallization; M. P. 198–200° C. *Analysis.*—Calc'd for $C_{19}H_{23}NO_3 \cdot CH_3OH \cdot HCl$: C, 62.90; H, 7.39; N, 3.67. Found: C, 62.82; H, 7.31; N, 3.87.

*Example 3*

One part of N-n-propylnormorphine hydrochloride, solvated with one molecule of methanol of crystallization, was recrystallized from a mixture of methanol and ether to give substantially pure N-n-propylnormorphine hydrochloride; M. P. 260° C. $[\alpha]_D^{25°\,C.} = -94°$. *Analysis.*—Calc'd for $C_{19}H_{23}NO_3HCl$: C, 65.24; H, 6.91. Found: C, 64.44; H, 6.76.

*Example 4*

A mixture of 1.5 g. of N-n-propylnormorphine and 10 ml. of acetic anhydride was heated under reflux for a period of one and one-half hours. The reaction mixture was evaporated substantially to dryness under reduced pressure and to the residual material was added approximately 3 g. of chopped ice. The resulting aqueous solution was neutralized with ammonium hydroxide and the precipitated material was recovered and recrystallized twice from absolute ethanol to give substantially pure N-n-propylnormorphine diacetate; M. P. 135–136° C.; $[\alpha]_D^{25°\,C.} = -177°$. *Analysis.*—Calc'd for $C_{23}H_{27}NO_5$: C, 69.50; H, 6.85; N, 3.53. Found: C, 69.26; H, 6.85; N, 3.33.

Various changes and modifications may be made in carrying out the present invention without departing from the spirit and scope thereof. Insofar as these changes and modifications are within the purview of the annexed claims, they are to be considered as part of my invention.

I claim:

1. A compound selected from the group which consists of N-n-propylnormorphine, its lower alkanoyl esters, and acid addition salts thereof.
2. N-n-propylnormorphine.
3. 3,6-dipropionyl-N-(n-propyl)-normorphine.
4. N-n-propylnormorphine hydrochloride.
5. N-n-propylnormorphine sulfate.
6. N-n-propylnormorphine tartrate.

(References on following page)

References Cited in the file of this patent

UNITED STATES PATENTS

| | | |
|---|---|---|
| 2,364,833 | Weijlard | Dec. 12, 1944 |
| 2,625,566 | Heinzelmann | Jan. 13, 1953 |

FOREIGN PATENTS

| | | |
|---|---|---|
| 191,088 | Germany | June 9, 1904 |
| 289,274 | Germany | Dec. 14, 1915 |

OTHER REFERENCES

Braun: Ber. 49, 977–89 (1916).
Bergel: Quarterly Review of Chem. Soc., vol. II, #4, p. 356 (1948).
Craig: Chem. Review, vol. 42, p. 395 (1948).